United States Patent [19]

Gergen

[11] Patent Number: 4,818,798
[45] Date of Patent: Apr. 4, 1989

[54] POLYMER BLEND OF CARBON MONOXIDE/OLEFIN COPOLYMER AND COPOLYESTER ELASTOMER

[75] Inventor: William P. Gergen, Houston, Tex.

[73] Assignee: Shell Oil Company, Houston, Tex.

[21] Appl. No.: 208,516

[22] Filed: Jun. 20, 1988

[51] Int. Cl.$^4$ .................................................. C08F 8/00
[52] U.S. Cl. ...................................... 525/539; 525/55; 525/153; 525/189; 525/130; 528/392
[58] Field of Search .......................... 525/539; 528/392

[56] References Cited

U.S. PATENT DOCUMENTS 4,642,326 2/1987 Yasumura et al. .................. 525/153

Primary Examiner—Harold D. Anderson
Assistant Examiner—T. Mason

[57] ABSTRACT

Blends of (a) a linear alternating polymer of carbon monoxide and at least one ethylenically unsaturated hydrocarbon and (b) a thermoplastic copolyester thermoplastic polymer having either linkages in one recurring unit of the polymeric chain, exhibit high surface gloss and improved processability without deterioration in impact strength.

11 Claims, No Drawings

POLYMER BLEND OF CARBON MONOXIDE/OLEFIN COPOLYMER AND COPOLYESTER ELASTOMER

FIELD OF THE INVENTION

This invention relates to an improved polymer blend comprising predominately a linear alternating polymer of carbon monoxide and at least one ethylenically unsaturated hydrocarbon. More particularly, the invention relates to blends of the linear alternating polymer with a thermoplastic copolyester elastomer having ether linkages within the polymeric claim.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds,. U.K. No. 1,081,014 produced similar polymers of higher carbon monoxide content in the presence of alkylphosphine complexes of palladium salts as catalyst. Nozaki extended this process to produce linear alternating polymers by the use of arylphosphine complexes of palladium moieties and certain inert solvents. See, for example, U.S. Pat. No. 3,964,412.

More recently the class of linear alternating polymers of carbon monoxide and at least one ethylenically unsaturated hydrocarbon has become of greater interest, in part because of the greater availability of the polymers in quantity. These polymers, often referred to as polyketones or polyketone polymers have been shown to be of the repeating formula —CO—(A)— wherein A is the moiety of unsaturated hydrocarbon polymerized through the ethylenic unsaturation. For example, when the hydrocarbon is ethylene, the polymer is represented by the repeating formula —CO—(CH$_2$—CH$_2$)—. The general process for the more recent production of such polymers is illustrated by a number of published European Patent Applications including No. 121,965 and No. 181,014. The process typically involves a catalyst composition formed from a compound of Group VIII metal selected from palladium, cobalt or nickel, the anion of a strong non-hydrohalogenic acid and a bidentate ligand of phosphorus, arsenic or antimony.

The resulting polymers are relatively high molecular weight thermoplastics having established utility in the production of shaped articles such as containers for food and drink and parts for automotive applications, which articles are produced by processing the polymer by known techniques. For some particular applications it has been found desirable to have properties for a polymeric composition which are somewhat different from those of the polyketone polymers. It would be of advantage to retain the more desirable properties of the polyketone polymers and yet improve other properties. These advantages are often obtained through the provision of a polymer blend.

SUMMARY OF THE INVENTION

The present invention contemplates the provision of blends of linear alternating polymer of carbon monoxide and at least one ethylenically unsaturated hydrocarbon with certain other polymeric material. More particularly, according to the invention, there are provided blends of the linear alternating polymer with a thermoplastic copolyester elastomer having, within one recurring segment of the elastomer, a plurality of oxygen linkages. The resulting blends exhibit high surface gloss and improved processability without deterioration of impact resistance.

DESCRIPTION OF THE INVENTION

The polyketone polymers which are employed as the major component of the blends of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other alpha-olefins including propylene, butylene, isobutylene, 1-hexene, 1-octene and 1-dodecene, or are arylaliphatic having an aromatic substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-methylstyrene. Preferred polyketone polymers are copolymers of carbon monoxide and ethylene or terpolymers of carbon monoxide, ethylene and a second ethylenically unsaturated hydrocarbon of at least 3 carbon atoms, particularly an alpha-olefin such as propylene.

The structure of the polyketone polymers is that of a liner alternating polymer of carbon monoxide and ethylenically unsaturated hydrocarbon and the polymer will contain substantially one molecule of carbon monoxide for each molecule of unsaturated hydrocarbon. When terpolymers of carbon monoxide, ethylene and a second hydrocarbon are employed in the blends of the invention there will be within the terpolymer at least two units incorporating a moiety of ethylene for each unit incorporating a moiety of the second hydrocarbon. Preferably there will be within the terpolymer from about 10 to about 100 units incorporating a moiety of ethylene for each unit incorporating a moiety of the second hydrocarbon. The polymer chain will therefore be represented by the repeating formula

wherein G is the moiety obtained by polymerization of the second hydrocarbon of at least 3 carbon atoms through the ethylenic unsaturation. The —CO—CH$_2$—CH$_2$)— units and the —CO—G— units are found randomly throughout the polymer chain and the ratio of y:x is no more than about 0.5. In the modification of the invention where a copolymer of carbon monoxide and ethylene is employed as a blend component there will be no second hydrocarbon present and the polymer will be represented by the above formula wherein y=0. When y is other than 0, i.e., terpolymers are employed, the ratio of y:x will preferably be from about 0.01 to about 0.1. The end groups or "caps" of the polymer chain will depend on what materials are present during the production of the polymer and whether and how the polymer has been purified. However, the precise properties of the polymer will not depend on the particular end groups to any considerable extent so that the polymer is fairly represented by the above formula for the polymeric chain. Of particular interest are the polyketone polymers of number average molecular weight from about 1000 to about 200,000, particularly those of number average molecular weight from about 20,000 to about 90,000 as determined by gel permeation chromatography. The physical properties of such polymers will depend in part on the molecular weight, whether the polymer is a copolymer or a terpolymer and, in the case of terpolymers, the nature of and the relative proportion of the second hydrocarbon present. Typical melting points for such polymers are from about 175° C. to about 300° C., more typically from about 210° C. to about 270° C. The polymers have a limiting viscosity number (LVN), when measured in a standard capillary viscosity measuring device in m-cresol at 60° C., of from about 0.5 to about 10, preferably from about 0.8 to about 4.

A method of producing the polyketone polymers which is now becoming conventional is to contact the carbon monoxide and unsaturated hydrocarbon(s) in the presence of a catalyst composition formed from a palladium compound, the anion of a non-hydrohalogenic acid having a pKa below about 6 and a bidentate ligand of phosphorus. The scope of the process of polyketone polymer production is extensive but, without wishing to be limited, a preferred palladium compound is a palladium carboxylate, particularly palladium acetate, a preferred anion is the anion of trifluoroacetic acid or p-toluenesulfonic acid, and a preferred bidentate phosphorus ligand is 1,3-bis(diphenylphosphino) propane or 1,3-bis(di(2-methoxyphenyl)phosphino)propane.

Polymerization is conducted in the gas phase in the substantial absence of reaction diluent or in a liquid phase in the presence of an inert diluent such as an alkanol, e.g., methanol or ethanol. The reactants are contacted under polymerization conditions in the presence of the catalyst composition while reactant contact is maintained by conventional methods such as shaking or stirring in a conventional reaction vessel. Suitable reaction temperatures are from about 20° C. to about 150° C. with preferred reaction temperatures being from about 50° C. to about 135° C. Typical reaction pressures are from about 1 bar to about 200 bar, more typically from about 10 bar to about 100 bar. Subsequent to reaction, the polymer product is recovered by conventional techniques such as decantation or filtration. The polymer product may contain residues of the catalyst composition which are removed, if desired, by contacting the polymer product with a solvent or complexing agent which is selective for the residues.

the copolyester polymer comprises recurring long chain ester units of the formula

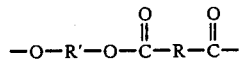

and recurring short chain ester units of the formula

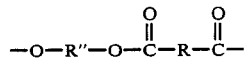

wherein R is the divalent radical derived by exclusion of the carboxyl groups of a dicarboxylic acid having a molecular weight below about 300; R' is a divalent radical derived by exclusion of the terminal hydroxyl groups from a poly(alkylene oxide) glycol having a carbon to oxygen ratio of from about 2.5 to about 4.3, a molecular weight above about 400 and a melting point below about 60° C.; and R" is a divalent radical derived by exclusion of the hydroxy groups from a low molecular weight diol having a molecular weight below about 250.

The low molecular weight diol, HO—R"—OH, is acyclic, alicyclic or aromatic of up to 15 carbon atoms inclusive such as ethylene glycol, propylene glycol (1,2- and 1,3-), tetramethylene glycol, dihydroxycylohexane and 1,4-hydroquinone. Preferred are the aliphatic diols of up to 8 carbon atoms inclusive.

The dicarboxylic acid, $HO_2C-R-CO_2H$, is aliphatic, cycloaliphatic or aromatic and is illustrated by sebacic acid, oxalic acid, 1,3-cyclohexanedicarboxylic acid, terephthalic acid, 2,7-naphthalenedicarboxylic acids, isophthalic and phthalic acid. The preferred dicarboxylic acids are aromatic dicarboxylic acids of up to 12 carbon atoms inclusive.

The poly(alkylene oxide) glycol, HO—R'—OH is illustrated by poly(propylene oxide) glycol, poly(tetramethylene oxide) glycol and a mixture of poly(ethylene oxide) glycol and poly(propylene oxide) glycol in such proportion that the carbon to oxygen ratio exceeds about 2.5.

Preferred copolyester polymers are those wherein at least about 80% of the R units are 1,4-phenylene and at least about 80% of the R" units are tetramethylene. The preferred R' units are derived from poly(tetramethylene oxide) glycol. Such a preferred copolyester polymer has the general formula

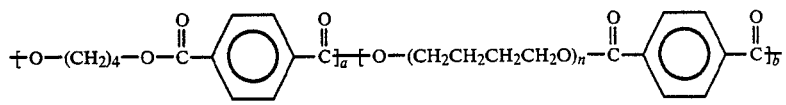

The minor component of the blends of the invention is a thermoplastic copolyester elastomer polymer having ether linkages within one recurring segment of the polymer chain. The thermoplastic copolyester elastomer polymer comprises a number of recurring long chain ester units and short chain ester units connected heat to tail through ester linkages. The long chain ester unit is a unit derived from an ether linkage-containing poly(alkylene oxide) glycol and the short chain ester unit is derived from a relatively low molecular weight aliphatic diol. The acid portion of the copolyester polymer is derived from a relatively low molecular weight dicarboxylic acid. In one modification of the invention, where a and b are independently integers of at least 1 to about 200, preferably 1 to about 100, and more preferably 1 to about 50 and n is an integer of at least 5 to about 100, preferably 5 to about 50 and more preferably 5 to about 15.

Such thermoplastic copolyester elastomer polymers are known in the art and are marketed by DuPont under the tradename HYTREL and by Toyobo under the tradename PELPRENE. Also known are the procedures for the production of such copolyesters. For a more extensive disclosure of the nature of the polymers and processes for their production see Witsiepe, U.S. Pat. No. 3,766,146, Wolfe, Jr., U.S. Pat. No. 3,775,373, and Hoeschele, U.S. Pat. No. 4,362,836 and the article *Journal of Elastomers and Plastics,* 1977, 9 (October), 416–438, the disclosures of which are incorporated herein by reference.

The blends of the invention comprise a mixture of a major proportion of the polyketone polymer and a minor proportion of the copolyester polymer. The precise proportion of the copolyester polymer in the blend is not critical and amounts of the copolyester polymer from about 0.5% by weight to about 45% by weight, based on total blend, are satisfactory. Amounts of copolyester from about 1% to about 20% are preferred.

The method of producing the blends of the invention is not material so long as a relatively uniform distribution of the copolyester polymer throughout the polyketone polymer is obtained. The polyketone polymer/copolyester polymer blend is a non-miscible blend with the copolyester polymer existing as a discrete phase within the polyketone polymer matrix having a phase size from about 0.2 microns to about 2.0 microns, more often on the order of about 1.0 microns. The blend will not, therefore, be homogeneous, but good properties are obtained when the distribution of the copolyester polymer throughout the polyketone polymer matrix is substantially uniform. The method of blending the components is that which is conventional for non-miscible polymeric materials. In one modification, the polymeric components in particulate form are mixed and passed through an extruder operating at elevated temperature and high RPM to produce the blend as an extrudate. In an alternate modification the components are blended in a mixing device which exhibits high shear.

The blends of the invention may also include conventional additives such as antioxidants, stabilizers, fillers, fire resistant compounds, mold release agents and other materials which are added to increase the processability of the polymeric components or improve the properties of the blend. Such additives are added by conventional methods prior to, together with or subsequent to the blending of the polyketone and copolyester components.

The blends of the invention are characterized by high surface gloss and good processability without deterioration of impact resistance. The blends are of particular utility where production of articles requiring good surface appearance is contemplated. Such applications include the production of shaped articles such as containers as for food and drink and parts for exterior automotive applications. The blends are processed by means of the usual techniques such as extrusion and injection molding into sheets, films, plates and shaped articles.

The invention is further illustrated by the following Illustrative Embodiments which should not be construed as limiting the invention.

ILLUSTRATIVE EMBODIMENT I

A terpolymer of carbon monoxide, ethylene and propylene was produced in the presence of a catalyst composition formed from palladium acetate, the anion of p-toluenesulfonic acid and 1,3-bis[di(2-methoxyphenyl)phosphino]propane. The terpolymer had a melting point of 220° C. and an LVN, measured in m-cresol at 60° C., of 1.29.

ILLUSTRATIVE EMBODIMENT II

A blend of the terpolymer of Illustrative Embodiment I was prepared with 10% by volume of HYTREL ® 4056 copolyester elastomer. HYTREL 4056 copolyester elastomer has a melting temperature of 298° C. and is available from the DuPont Company. The polyketone terpolymer contained approximately 0.5% by weight of Irganox 1076 and 0.2% by weight Ionol, two conventional hindered phenolic antioxidants to provide background stabilization. An additional 0.5% by weight based on total blend Ethyl AO 330, another hindered phenolic antioxidant, was added to the blend composition. The blend was prepared in a 30 mm twin screw Haake extruder at 240° C. A sample of the terpolymer of Illustrative Embodiment I also containing stabilizer was extruded as a control. In comparison to the control, the blend extruded at a substantially higher injection rate and a lower injection pressure. The extruded blend also had a high gloss surface in comparison to a dull finish for the control. Room temperature notched izod strengths for the blend and the control were measured using ASTM Method D256 and were comparable. The results of the measurements are shown in Table I.

TABLE I

| Sample | Injection Rate | Injection Pressure (psi) | Surface Appearance | Notched Izod (ft-lb/in) |
| --- | --- | --- | --- | --- |
| Control | 2.5 | 500 | Dull Finish | 3.1 |
| 10% v Blend | 4.0 | 400 | High Gloss | 3.0 |

What is claimed is:

1. A composition comprising a non-miscible blend of, as a major component, a linear alternating polymer of carbon monoxide and at least one ethylenically unsaturated hydrocarbon and, as a minor component, a thermoplastic copolyester elastomer polymer having ether linkages within one recurring segment of the polymer chain.

2. The composition of claim 1 wherein the linear alternating polymer is represented by the repeating formula

wherein G is the moiety of an ethylenically unsaturated hydrocarbon of at least 3 carbon atoms polymerized through the ethylenic unsaturation and the ratio of y:x is no more than about 0.5.

3. The composition of claim 2 wherein the copolyester polymer comprises recurring long chain ester units of the formula

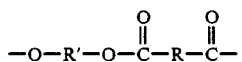

and recurring short chain ester units of the formula

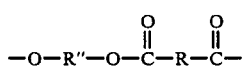

wherein R is the divalent radical derived from exclusion of the carboxyl groups of a dicarboxylic acid having a molecular weight below about 300; R' is a divalent radical derived by exclusion of the terminal hydroxyl groups from a poly(alkylene oxide) glycol having a carbon to oxygen ratio of from about 2.5 to about 4.3, a molecular weight above about 400 and a melting point below about 60° C.; and R" is a divalent radical derived by exclusion of the hydroxy groups of a diol having a molecular weight below about 250.

4. The composition of claim 3 wherein y=0.

5. The composition of claim 3 wherein G is the moiety of propylene and the ratio of y:x is from about 0.01 to about 0.1.

6. The composition of claim 5 wherein at least 80% of the R units are 1,4-phenylene.

7. The composition of claim 6 wherein at least 80% of the R" units are tetramethylene.

8. The composition of claim 7 wherein the alkylene portion of the R' units are tetramethylene.

9. The composition of claim 3 wherein the copolyester polymer has the formula

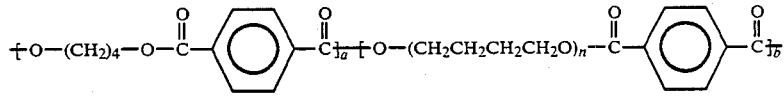

where a and b are independently integers of 1 to about 100 and n is an integer of at least 5 to about 50.

10. The composition of claim 9 wherein G is the moiety of propylene and the ratio y:x is from about 0.01 to about 0.1.

11. The composition of claim 9 wherein y is 0.

* * * * *